J. MURGAS.
METHOD OF AND APPARATUS FOR PRODUCING ELECTRIC OSCILLATIONS FROM ALTERNATING CURRENTS.
APPLICATION FILED APR. 23, 1909.

1,196,969.

Patented Sept. 5, 1916.

Witnesses

Inventor
Joseph Murgas
By
Foster, Freeman, Watson & Coit
Attorneys

UNITED STATES PATENT OFFICE.

JOSEPH MURGAS, OF WILKES-BARRE, PENNSYLVANIA.

METHOD OF AND APPARATUS FOR PRODUCING ELECTRIC OSCILLATIONS FROM ALTERNATING CURRENTS.

1,196,969.                    Specification of Letters Patent.        Patented Sept. 5, 1916.

Application filed April 23, 1909. Serial No. 491,788.

*To all whom it may concern:*

Be it known that I, JOSEPH MURGAS, a citizen of the United States, and resident of Wilkes-Barre, in the county of Luzerne and State of Pennsylvania, have invented certain new and useful Improvements in Methods of and Apparatus for Producing Electric Oscillations from Alternating Currents, of which the following is a specification.

This invention relates to a method of and apparatus for producing undamped electric oscillations of high frequency from alternating currents.

British patent to Duddell 21,629 of 1900, and U. S. patent to Poulsen 789,499, describe methods whereby by the employment of suitable inductance and capacity, in connection with an electric arc, electric oscillations of high frequency may be produced from direct currents.

The employment of a direct current arc, especially if the electrodes are of carbon, is open to a number of objections. The arc is very unsteady, and, due to the rapid evaporation of the carbon electrodes, frequent adjustment is necessary in order to keep the electrodes a proper distance apart. The efficiency of the arc method is also very low due to the fact that the arc itself consumes the greatest part of the direct current energy for maintaining itself, and only a small percentage is converted into an alternating current.

This invention employs an alternating current for producing the high frequency oscillations. An alternating current of moderate voltage is stepped up to a high voltage and connected across the terminals of an arc or spark gap. I preferably use platinum or steel plugs, although I may use carbon. In shunt with the arc or gap is the well-known arrangement of an adjustable inductance and capacity, forming with the arc or gap the oscillating circuit. A strong air blast is used. This blast performs a fourfold function; first it cools the electrodes and therefore allows a much smaller gap to be used, giving a higher frequency in the oscillating circuit; second it increases the dielectric strength of the gap due to the higher air pressure; third, it completely blows out and extinguishes the arc, and fourth it unites the discharge in one single thick discharge which is purely oscillatory in character, of very high frequency, and nearly noiseless, and therefore is well adapted for wireless telegraphy and telephony.

Figure 1:
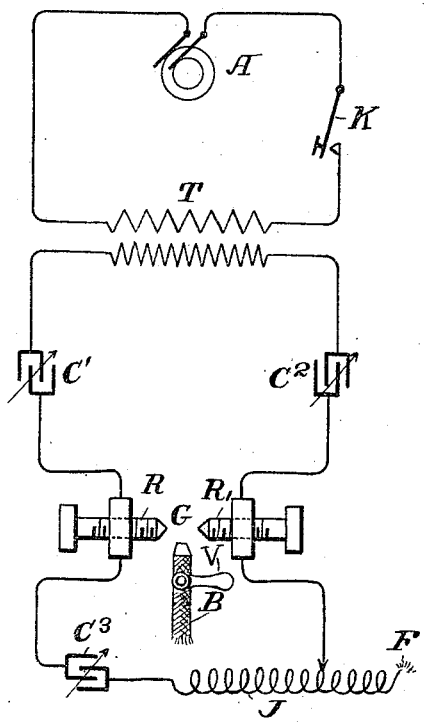
Figure 2:
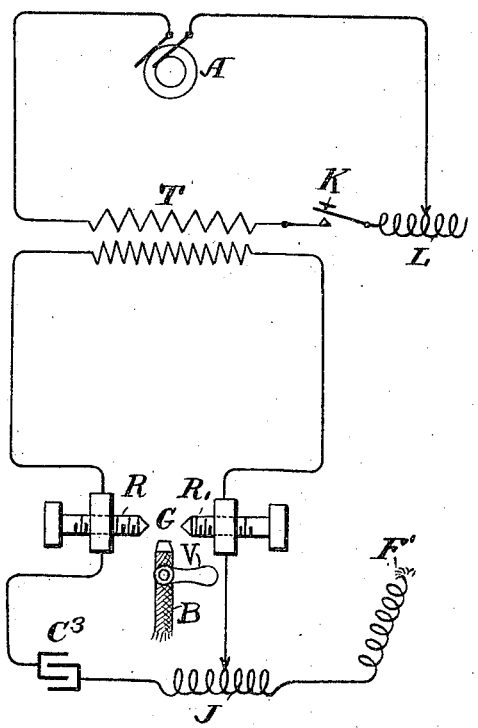
Figure 3:
Figure 4:
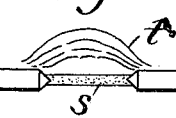
Figure 5:
Figure 6:
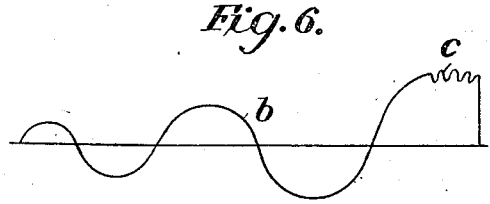
Figure 7:
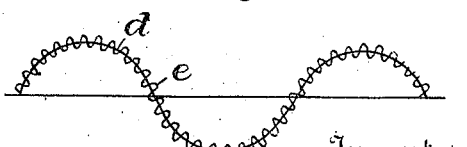

In the drawings: Figure 1 is a diagram showing the features of this invention; Fig. 2 is a diagram showing another form; Figs. 3, 4 and 5 are diagrams showing three different stages of the high frequency discharge; Figs. 6 and 7 are wave diagrams.

Referring to Fig. 1, A designates an alternator of moderate voltage connected in circuit with a primary of the high voltage transformer T, which steps up the voltage of the alternator to a high voltage (ten thousand volts or more). A key K is placed in the primary circuit to make and break the same.

A pair of electrodes R, $R^1$ are connected in shunt with an adjustable condenser $C^3$ and adjustable inductance J, across the terminals of the secondary of the transformer T. A pair of adjustable condensers $C'$, $C^2$ are placed in the secondary circuit to regulate the amount of current flowing from the secondary to the spark gap G and the shunt circuit $C^3$, J. The condensers $C'$, $C^2$ are preferably adjusted in steps by cutting in and out the plates, but the adjustment of $C^3$ must be fine in order to bring the gap and the shunt circuits in syntony; a condenser in which the plates slide relatively is therefore used, or any other form which will give a fine adjustment.

An air blast nozzle B is located so as to deliver a strong air blast on the air gap. The nozzle is connected by a tube to a pressure tank so that the air may be delivered at a comparatively high pressure, amounting to several pounds per square inch. The pressure of the nozzle is adjusted by a valve V, or any other convenient means.

The electrodes R, $R^1$ are preferably constructed of platinum or steel with pointed ends, although carbon plugs also give good results, but they are open to the objection that they wear down too fast and need frequent and close adjustment. Where carbons are used a feeding mechanism is preferably provided which automatically feeds the carbons as they are worn down. I have however found that platinum or steel plugs give much better results than carbon, in part due to the fact that they do not wear down so fast.

In the construction shown in Fig. 2 a variable inductance L is placed in circuit with the alternator A, the key K, and the primary of the high voltage transformer T. This variable inductance regulates the current delivered to the gap G and therefore the condensers C', C² can be dispensed with. The electrodes R, R¹, the air blast B, condenser C³ and inductance J are the same as in Fig. 1. F' is a Seibt coil.

The operation is as follows: The key K is depressed and a high potential is applied to the terminals of the spark gap G. The electrodes or spark plugs R, R¹ are now adjusted until the length is about one-half of the full discharge, that is one-half of the greatest arc that the voltage impressed upon the gap can give. The discharge is now very rapid, producing a low sissing noise and composed of a great number of silver thread-like discharges. The condenser C³ and the inductance J are now adjusted until there is obtained a peculiar irregular discharge, Fig. 3, composed of an arc $a$, and a number of thread-like discharges $t$; at this stage a Tesla discharge is seen at the end F of the inductance J or at the Seibt coil F', the flame being powerful and irregular. This stage is also easily detected at the spark gap, the discharge being as shown in Fig. 3, and is the stage where the circuits C³, J and G are in syntony. I find that this phenomena first begins to occur when the gap is adjusted to one-half of the full discharge, i. e. one half of the striking distance for the applied voltage. At this point the air blast B is turned on slowly by means of the valve. The air blast first blows out the arc $a$ and unites some of the threads $t$ in the form of a thick discharge $s$, Fig. 4. As the pressure is still further increased a point is reached where all the threads $t$ are united into a single thick discharge $s$, Fig. 5, which is brilliant white in appearance and which is absolutely oscillatory in character and of very high frequency. The effect can be seen by an increased and steady discharge at F and F'.

Fig. 6 shows the charging curve $b$ of the ordinary condenser when connected in shunt with the ordinary spark gap. As shown the condenser will slowly charge until the air gap is broken down and the condenser discharges itself through the gap, producing high frequency oscillations, as shown at $c$. As is well known these oscillations are damped oscillations.

In using my apparatus, when the discharge is of the character shown at $s$, Fig. 5, that is, a single thick discharge, the character of the oscillations produced is that shown diagrammatically in Fig. 7; that is, when the gap and the shunt circuits are in syntony then besides the tone of the alternator a very high sissing noise is heard. This sissing noise is however very soft. The alternator tone is represented in Fig. 7 by the curve $d$, while $e$ represents the high frequency oscillations of the thick discharge $s$. This high frequency wave $e$, I believe, is a very high harmonic of the alternator wave $d$, produced in the oscillating circuit.

The function of the air blast is fourfold: first, to keep the electrodes cool and allow the plugs to be placed closer together; second, to increase the air pressure at the gap and thereby increase the dielectric strength; third, to extinguish the arc, and fourth to unite the thread-like discharges $t$ into the form of a single thick discharge, producing undamped oscillations. The air blast increases the resistance of the air gap in the same way as when the gap is inclosed in a vessel containing compressed air, i. e., the frequency of the oscillations rises very rapidly with the pressure.

The pressure which is to be given to the air blast depends upon the transformer current flowing through the gap. By using a heavy current the air pressure must be increased proportionately. For very large currents the air blast must be several pounds per square inch. By using an air blast the length of the gap can be decreased to a minimum. The effect shown in Fig. 3 takes place when the electrodes are adjusted to one-half of the full discharge, but under working conditions the gap can be decreased down to one thirty-second of an inch. By decreasing the length of the air gap and adjusting C³, J to the proper point, and preventing the formation of the arc, the wave train $e$, Fig. 7, may be obtained in which the frequency is a maximum. In this form of discharge the tone of the alternator is practically eliminated because the wave train $e$ is continuous and therefore the discharge is practically noiseless. Because the arc is blown away from the gap, and only the purest oscillatory discharge passes through it, the transformation of energy is very efficient. The waste of current of the Duddell and Poulsen arcs is very great because the current must maintain the arc and only a small percentage is converted into high frequency undamped oscillations. The thick discharge $s$ is of a pure oscillatory character, giving undamped oscillations of high frequency and being very efficient. The closed oscillating circuit C³, J, G may be coupled to the antennæ by means of any well-known coupling.

Although I have shown and described an air blast B, for extinguishing and cooling the electrodes and uniting the thread-like discharge into a single thick discharge $s$, it is to be understood that I may use other means for accomplishing the same purpose, the main object being to blow out the arc formed and to unite the thread-like discharge into a single thick oscillatory discharge.

What I claim is:

1. The herein described method of producing high frequency electric oscillations suitable both for wireless telegraphy and wireless telephony, which comprises establishing a discharge in a short gap between a set of electrodes by impressing a relatively high potential alternating current upon the electrodes, adjusting the current supply of the impressed alternating current and adjusting the electrodes until an arc discharge and a number of thread-like oscillatory discharges cross the gap, directing an air blast upon and transversely of the electrodes and across the spark gap and adjusting the pressure of said air blast until the arc is extinguished and the thread-like discharges are united into a single thick quenched spark discharge, substantially as described.

2. The herein described method of producing very high frequency electric oscillations suitable both for wireless telegraphy and wireless telephony, which consists in establishing a discharge in a short gap between a set of electrodes by impressing a relatively high potential alternating current upon the electrodes while they are connected in an oscillation circuit containing self-induction and capacity, adjusting the impressed alternating current, the electrodes, the self-induction and capacity until an arc discharge and a number of thread-like oscillatory discharges cross the gap, directing a cooling air blast upon and transversely of the electrodes and across the spark gap beginning with a low pressure blast and increasing the pressure, whereby the arc discharge is continuously extinguished and the thread-like discharges are finally united into a single thick quenched spark discharge of brilliant white appearance and of absolutely oscillatory character and very high frequency.

3. In an apparatus for producing high frequency electric oscillations, the combination of a pair of relatively adjustable electrodes, alternating current supply mains adapted to be connected to said electrodes for impressing an alternating current thereon, a condenser located in circuit with each of said mains for varying the phase of the current and energy delivered to said electrodes, an oscillation circuit connected with said electrodes and including self-induction and capacity, and means for directing an arc extinguishing blast upon and transversely of said electrodes.

In testimony whereof I affix my signature in presence of two witnesses.

JOSEPH MURGAS.

Witnesses:
 JOHN P. POLLOCK,
 J. CLAIRE JOHNSTON.